(12) United States Patent
Bae et al.

(10) Patent No.: US 7,376,095 B2
(45) Date of Patent: May 20, 2008

(54) APPARATUS AND METHOD FOR MEASURING A RECEIVED SIGNAL TO INTERFERENCE RATIO IN A MOBILE COMMUNICATION SYSTEM

(75) Inventors: Sang-Min Bae, Suwon-shi (KR); Ji-Won Ha, Seoul (KR); Jin-Woo Heo, Songnam-shi (KR); Jong-Han Kim, Yongin-shi (KR)

(73) Assignee: Samsung Electronics Co., Ltd (KR)

( * ) Notice: Subject to any disclaimer, the term of this patent is extended or adjusted under 35 U.S.C. 154(b) by 949 days.

(21) Appl. No.: 10/225,652

(22) Filed: Aug. 21, 2002

(65) Prior Publication Data
US 2003/0039222 A1 Feb. 27, 2003

(30) Foreign Application Priority Data
Aug. 23, 2001 (KR) .............................. 2001-50878

(51) Int. Cl.
*H04B 7/216* (2006.01)
(52) U.S. Cl. ...................... 370/320; 370/317; 370/318

(58) Field of Classification Search ................ 370/320, 370/317, 318
See application file for complete search history.

(56) References Cited

U.S. PATENT DOCUMENTS

| 6,836,666 | B2 * | 12/2004 | Gopalakrishnan et al. ........................................................... 455/452.2 |
| 2003/0119505 | A1 * | 6/2003 | Jou et al. ..................... 455/434 |
| 2004/0013102 | A1 * | 1/2004 | Fong et al. ................. 370/345 |

* cited by examiner

*Primary Examiner*—Huy D. Vu
*Assistant Examiner*—Jason Mattis
(74) *Attorney, Agent, or Firm*—The Farrell Law Firm, PC (57) ABSTRACT

An apparatus and method for measuring an SIR in a CDMA mobile communication system. The SIRs and power of PICHs and the power of PDCHs are measured sequentially for a plurality of active set base stations. An active set base station having the highest signal strength is selected according to the measurements. Thus a data rate is determined adaptively to the SIR for efficient high rate packet data transmission.

15 Claims, 7 Drawing Sheets

APPARATUS AND METHOD FOR MEASURING A RECEIVED SIGNAL TO INTERFERENCE RATIO IN A MOBILE COMMUNICATION SYSTEM

PRIORITY

This application claims priority to an application entitled "Apparatus and Method for Measuring Received Signal to Interference Ratio in a Mobile Communication System" filed in the Korean Industrial Property Office on Aug. 23, 2001 and assigned Serial No. 2001-50878, the contents of which are hereby incorporated by reference.

BACKGROUND OF THE INVENTION

1. Field of the Invention

The present invention relates generally to a mobile communication system, and in particular, to an apparatus and method for measuring a received signal to interference ratio (SIR) for efficient, high-speed packet data transmission in a mobile communication system supporting a multimedia service including voice and data.

2. Description of the Related Art

Typical $3^{rd}$ generation digital communication systems, particularly CDMA (Code Division Multiple Access) mobile communication systems, including IS-2000 and W-CDMA, support integrated transmission of voice, circuit data, and low rate packet data (e.g., packet data at or below 144 kbps). Along with the increasing demands for high rate packet data transmission like Internet browsing, mobile communication technology has been developed to support high rate packet data service. CDMA 2000 1xEV-DO (Evolution-Data Only) emerged to support a packet data service at a high rate, for example, at or above 2 Mbps. However, this system does not support a voice service. Therefore, there is a pressing need for a mobile communication system supporting the existing voice service and a high rate packet data service simultaneously.

One technique that satisfies the above demand and ensures efficient, high rate packet data transmission is AMC (Adaptive Modulation and Coding). In AMC, the fading of a radio channel is continuously monitored and data is transmitted at a data rate that ensures an error rate equal to or less than a threshold. An SIR measured in a mobile station is essential to measuring the radio channel status.

In general, a CDMA receiver is provided with a plurality of demodulation fingers to simultaneously demodulate signal components from multiple reflection paths, which are usually observed in a radio channel. Consequently, an SIR measurer is required for each demodulation finger. At a hard handoff from a radio channel to another radio channel, the mobile station must measure the SIRs of signals from base stations to which the hard handoff may occur (the base stations are managed as an active set) and thus have as many SIR measurers as the number of base stations.

Such an SIR measurer includes an F-PICH (Forward Pilot Channel) power measurer, an F-PDCH (Forward Packet Data Channel) power measurer, and a noise or interference power measurer.

The use of these complex SIR measurers is contradictory to the trend of terminal miniaturization and increases manufacture cost. Nevertheless, the SIR measuring technology is requisite for high rate packet transmission.

A mobile station utilizing AMC for efficient high rate packet transmission must measure the SIRs and packet channel power of base stations in its active set for a short time period, especially when power and orthogonal code resources assigned to packet data service users vary with the number of voice service users. Since a device for measuring the SIRs and packet power of signals from multiple reflection paths for all base stations is very complex, there is a pressing need for an accurate and less complex SIR measuring apparatus.

SUMMARY OF THE INVENTION

It is, therefore, an object of the present invention to provide an apparatus and method for enabling high rate packet transmission in a mobile communication system.

It is another object of the present invention to provide an apparatus and method for selecting a base station supporting the highest packet data rate, considering physical channel characteristics and ratios of power assigned to packet data transmission to the overall transmission power of base stations in a CDMA mobile communication system where voice service users coexist with packet data service users.

It is also another object of the present invention to provide an apparatus and method for efficiently measuring an SIR in a CDMA receiver having a plurality of demodulation fingers.

It is a further object of the present invention to provide an apparatus and method for efficiently measuring an SIR to support AMC required for increasing packet data transmission efficiency in a CDMA mobile communication system supporting high rate packet transmission.

It is still another object of the present invention to provide an apparatus and method for efficiently measuring an SIR to determine an optimum data rate of a radio channel for control of a packet data rate in a CDMA mobile communication system supporting voice and packet data services.

To achieve the above and other objects, there are provided an SIR apparatus and method in a mobile communication system. According to one aspect of the present invention, in a receiving apparatus of a mobile communication system that supports voice and packet data services, and manages an active set (i.e., a list of PN (Pseudorandom Noise) offsets of communicable transmitting apparatuses), an offline memory stores received data in real time and outputs a predetermined amount of the data in response to an external read command. An SIR measuring unit sequentially measures the SIRs of PICH signals and PDCH signals from the transmitting apparatuses in the active set from the read data, while varying the PN offsets, in response to an external measure command. A controller provides the read command to the offline memory and the measure command to the SIR measuring unit, and collects the SIR measurements.

According to another aspect of the present invention, a PDCH power measuring method for a mobile communication system that supports voice and packet data services, and manages an active set being a list of the PN offsets of communicable transmitters is provided. In the method, the power of a PICH from each of multiple reflection paths from the transmitters to a receiver is measured, all-path power of the PICH from the multiple reflection paths is calculated, the power of a PDCH from a selected one of the multiple reflection paths is measured, and all-path power of the PDCH is estimated by dividing the power of the PDCH from the selected reflection path by the power of the PICH from the selected reflection path and multiplying the division result by the all-path power of the PICH.

According to a further aspect of the present invention, a power measuring method for a mobile communication system that supports voice and packet data services, and manages an active set being a list of the PN offsets of communicable transmitters is provided. In the method, a predetermined amount of data is read from an offline memory that stores data received in successive time slots in real time. The power and SIR of a PICH and the power of a PDCH from each of the transmitters in the active set from the read data are then measured while varying the PN offsets. Then the power of PDCHs from the transmitters is compared. A transmitter having the highest PDCH power is selected, and the selection is notified to the selected transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention will be described below in the context of a forward link in a mobile communication system supporting a multimedia service including voice and data according to the 1×CDMA standards using a bandwidth of 1.25 MHz. To support voice service, an existing transmitter, channel structure, and receiver for a 1.25 MHz 1×system are still employed. A 1× bandwidth indicates 1.25 MHz used in an IS-95 North American synchronous system and a 1× system indicates a system supporting the 1× bandwidth.

It should also be noted that while the description of the present invention is made in relation to the L3QS proposal, one of the proposals for a synchronous CDMA communication system (IS-2000 1×EV-DV (Evolution-Data and Voice)), the basic aim of efficient SIR measuring can also be achieved in other communication systems operated relaying on similar technology and channel structure within the scope of the present invention.

Data service includes a variety of video services such as video conferencing and an Internet service. The data services are divided largely into circuit mode operation and packet mode operation according to the type of circuit connection. Data services in the circuit mode are provided using existing 1× system transmitters, channels, and receivers. Therefore, transmitters, channels, and receivers for the provision of data services in the packet mode will be described.

To provide a data service in a packet mode in an IS-2000 1×EV-DV system according to the present invention, the following forward channels are required.

An F-PICH is a forward common channel spread with a Walsh code $W_0$ and multiplexed with an F-PreCH (Forward Preamble Channel) and an F-PDCH (Forward Packet Data Channel) prior to transmission. Pilot symbols delivered on the F-PICH provide a reference amplitude and phase offset information for coherent demodulation, and assist to increase the accuracy of SIR measuring for control of a data rate. In the embodiment of the present invention, the F-PICH is the same in structure as the IS-95 pilot channel and subject to 1.2288-MHz chip spreading with a Walsh code #0 ($W_0$) with all +1 chip symbols.

The F-PreCH is a forward control channel spread with a Walsh code $W_1$ and multiplexed with the F-PICH and the F-PDCH prior to transmission. The F-PreCH identifies a mobile station to which a base station transmits a data packet, and serves to control the flow of user packet data transmitted on the F-PDCH. Thus the F-PreCH contains information about the number of time slots in which forward packet data is transmitted, MAC_ID (Media Access Control Identification) indicating a destination mobile station, SPID (Sub-Packet ID) indicating whether the transmitted packet is initially transmitted or retransmitted, and payload size, that is, the number of bits of the transmitted packet. Since the base station transmits a packet on the F-PDCH to all mobile stations at the same time, each of them must detect its packet for accurate packet transmission. The structure of the F-PreCH is generally known to those skilled in the technological art and, therefore, a detailed description of the F-PreCH will not be provided.

The F-PDCH is a forward dedicated data channel spread with Walsh codes $W_k$ to $W_{k+K-1}$ and multiplexed with the F-PICH and the F-PreCH prior to transmission. The F-PDCH delivers packet data.

One packet on the F-PDCH occupies at least one 1.25-ms time slot (1536 chips). The number of slots and a modulation scheme for transmitting the packet are selected adaptively to the current channel status (i.e. SIR). The F-PDCH transmits packet data in time division multiple access (TDMA) to a plurality of mobile stations at a high data rate. Upon receipt of SIR measurements on R-CQICHs (Reverse Channel Quality Indication Channels) from mobile stations, the base station selects a mobile station that transmitted the highest SIR among mobile stations connected to the base station, and modulates and transmits packet data in a particular slot to the selected mobile station at a maximum data rate allowed by the highest SIR. Since power assigned to the F-PDCH is the overall transmission power minus power assigned to voice and circuit data users, it varies depending on a power control of voice and circuit data channels. Similarly, after some Walsh codes are assigned to the voice and circuit data channels, the remaining Walsh codes are available to the F-PDCH.

The R-CQICH is a reverse dedicated control channel that transmits a value indicating the best base station in terms of the SIRs of its F-PICH and F-PDCH, and is similar to the F-PDCH in structure. The R-CQICH tells the base station the SIR of the F-PICH measured at the mobile station. At a hard handoff, the R-CQICH also selects a base station transmitting an F-PDCH with the highest signal power and transmits a command to request the base station to transmit packet data to the mobile station.

Aside from the above channels, there are traffic channels supporting voice and low rate (144 kbps or lower) circuit data, which are well known to those skilled in the art and thus will not be described here. When voice and circuit data channels are being serviced, they first occupy a predetermined Walsh code space in the base station and thus Walsh codes available to the F-PDCH are limited.

The following description is made of transmission of the F-PDCH with the appreciation that the R-CQICH is similar to the F-PDCH in structure.

Figure 1:
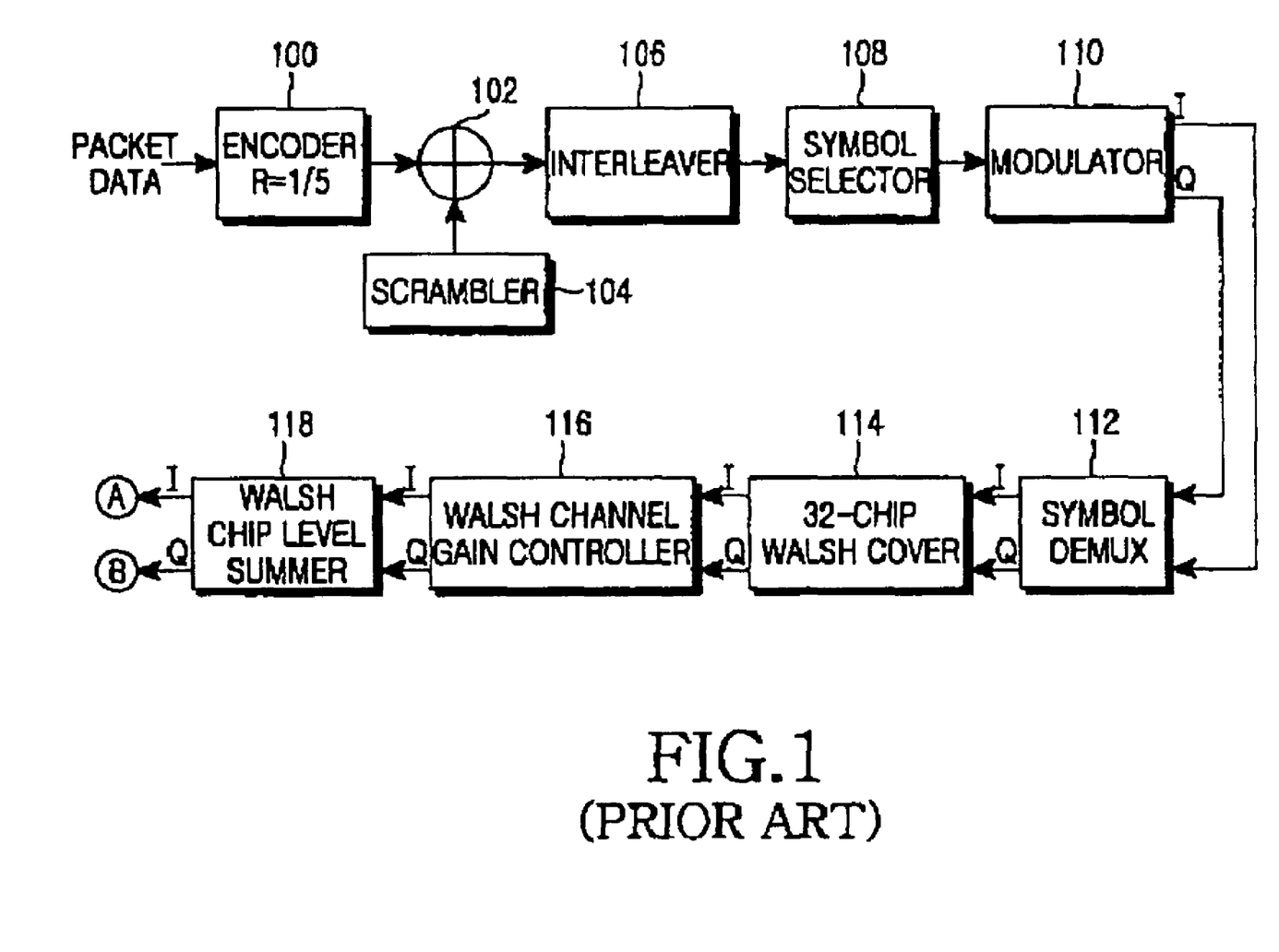
FIGS. 1 and 2 are block diagrams of an F-PDCH transmitter to which the present invention is applied.
Figure 2:
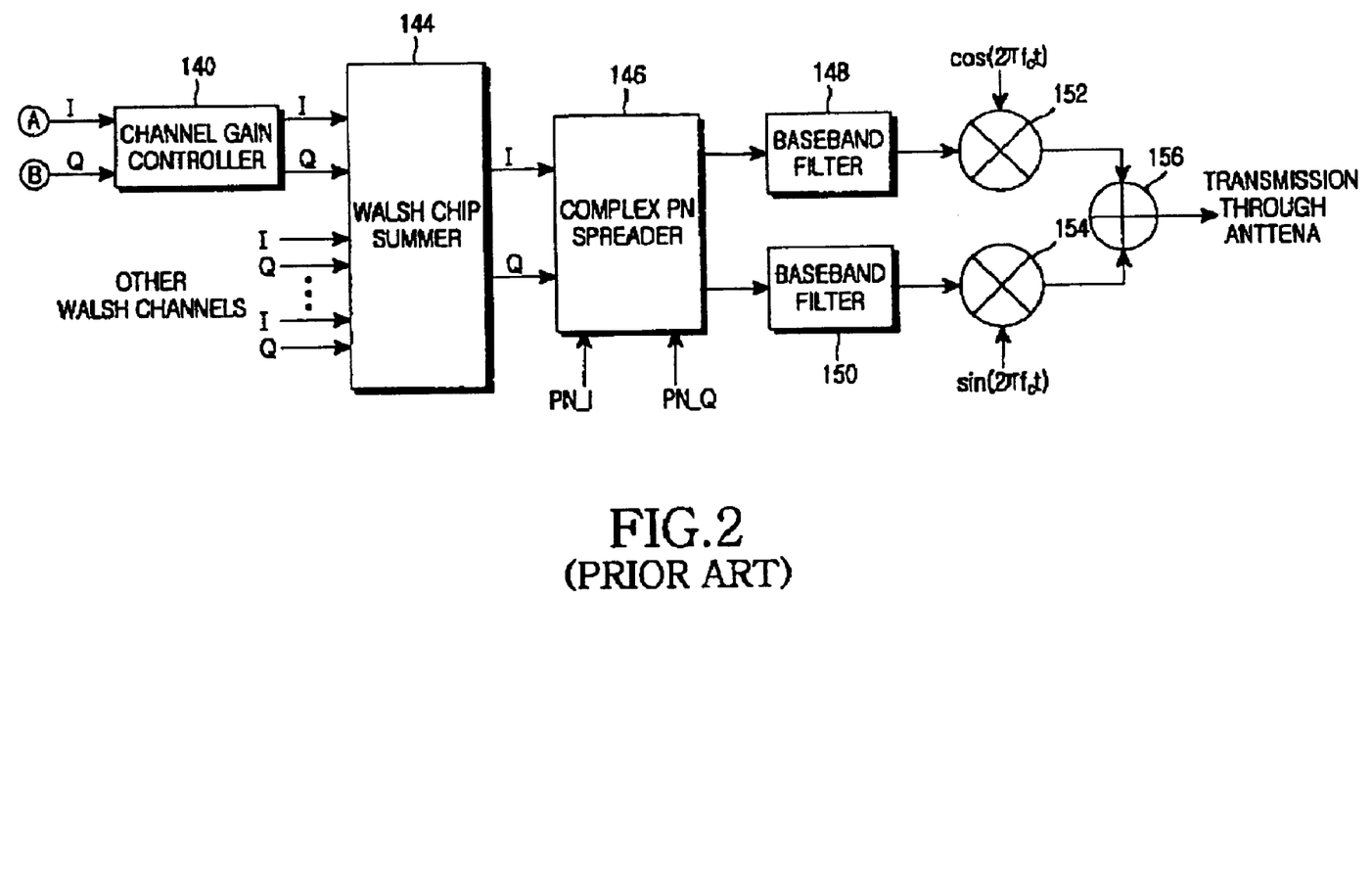

Referring to FIGS. 1 and 2, an encoder 100 encodes packet data at an appropriate code rate R (=⅕ in FIG. 1). An adder 102 then XOR-operates the code symbols with the output of a scrambler 104, for data scrambling. A QCTC (Quasi-Complementary Turbo Code) interleaver 106 interleaves the scrambled symbols and a symbol selector 108 punctures or repeats the interleaver output in order to form a sub-packet for ARQ (Automatic Repeat Request). A modulator 110 modulates the output of the symbol selector 108 and outputs I-channel and Q-channel modulation symbols.

A symbol demultiplexer (DEMUX) 112 demultiplexes each I-channel and Q-channel modulation symbol into as many signals as Walsh codes of length 32 available to an F-PDCH in a base station. A 32-chip Walsh cover 114 spreads the demultiplexed symbols with the Walsh codes and a Walsh channel gain controller 116 multiplies the outputs of the 32-chip Walsh cover 114 by a predetermined channel gain. Then, a Walsh chip level summer 118 separately sums the I-channel and Q-channel outputs of the Walsh channel gain controller 116 on a chip basis.

In FIG. 2, a channel gain controller 140 receives the I-channel and Q-channel outputs of the Walsh chip level summer 118 through terminals A and B, respectively, and controls their gains. A Walsh chip summer 144 sums the gain-controlled I-channel and Q-channel outputs of the channel gain controller 140 with I-channel and Q-channel outputs of other Walsh channels. A complex PN (Pseudorandom Noise) spreader 146 spreads the I-channel and Q-channel signals received from the Walsh chip summer 144 with codes PN_I and PN_Q, respectively. The complex-PN-spread I-channel and Q-channel signals are converted to signals in an RF (Radio Frequency) band having a carrier frequency $f_c$ as a central frequency through I and Q baseband filters 148 and 150 and mixers 152 and 154, and then combined in a combiner 156. The combined signal is transmitted through an antenna in the base station.

The F-PDCH is spread with a plurality of 32-chip Walsh codes, except for Walsh codes assigned to the F-PICH, voice and circuit data channels, and the F-PreCH. Information about the Walsh codes assigned to the F-PDCH is transmitted to a mobile station on a common control channel such as a paging channel. Each time the Walsh code information is changed due to the change of voice channel users or low rate data channel users, it is reported to the mobile station. At the same time, power assigned to the F-PDCH varies with power assigned to the voice and circuit data channels.

The mobile station measures the SIR of the F-PICH and reports the SIR to the base station in each 1.25-ms slot. When a hard handoff condition is satisfied as in the case where the PICH power of a serving base station is equal to or less than a threshold, the mobile station measures the power assigned to PDCHs from all base stations in its active set, selects a base station having the highest SIR measurement, and notifies the base station of the selection.

The reason for measuring the SIRs of the PDCHs at a hard handoff is that since power assigned to a PICH varies with power assigned to voice and low rate data channels in each base station in the active set (hereinafter, referred to as an active set base station), a base station having the highest SIR with respect to power available to a PDCH must be selected.

Here, the active set refers to a list of the pilot PN offsets of neighbor base stations (sectors in the case of a sectored base station) that transmit PICHs with enough power to enable a call handoff for the mobile station.

In accordance with the present invention, the mobile station measures the SIRs of PICHs and the power assigned to PDCHs from base stations connected to the mobile station in each 1.25-ms slot, and selects a base station having the highest SIR according to the SIR measurements.

Figure 3:
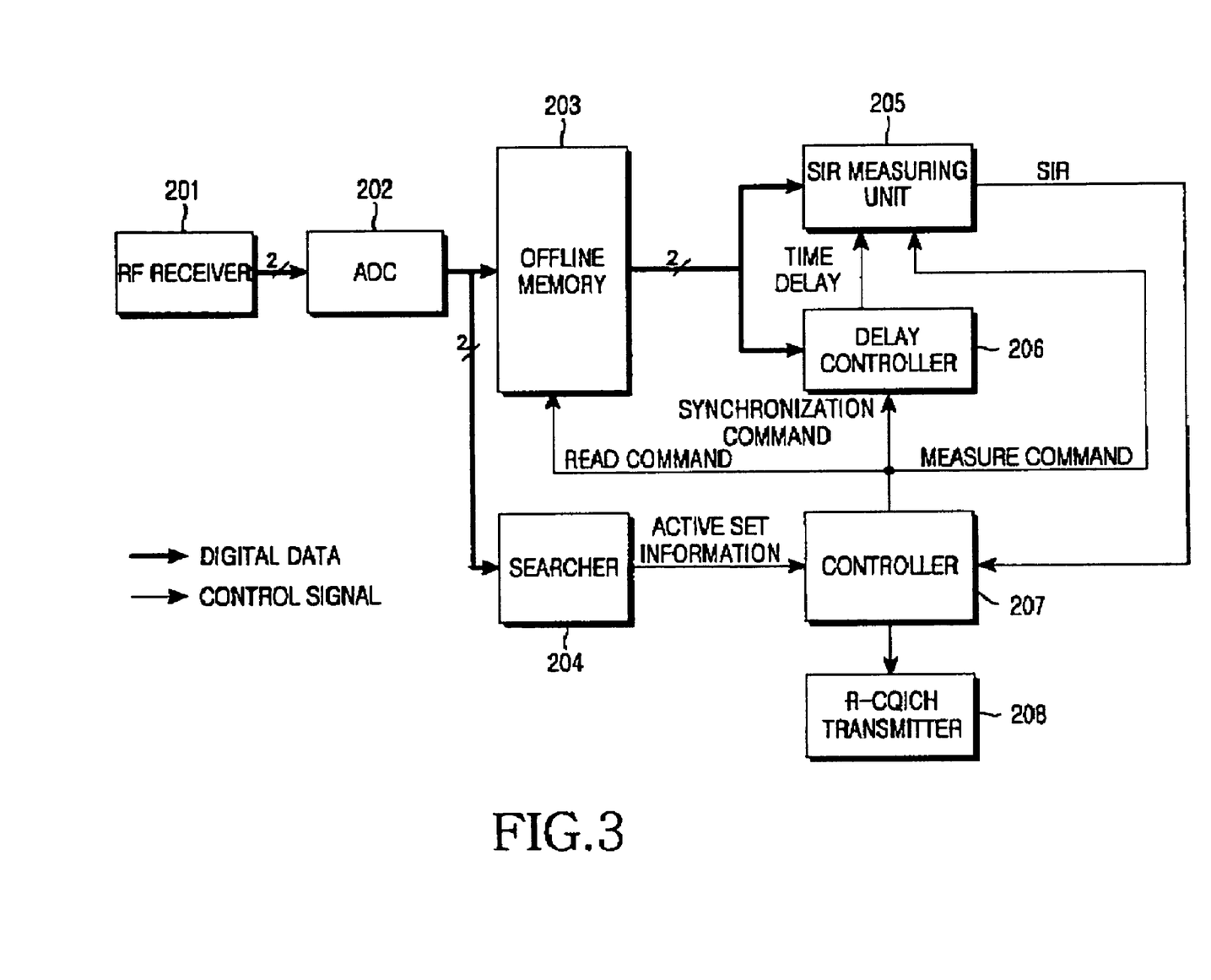
FIG. 3 is a schematic block diagram of an SIR measuring apparatus according to an embodiment of the present invention.

FIG. 3 is a block diagram of an SIR measuring apparatus according to an embodiment of the present invention. Referring to FIG. 3, the SIR measuring apparatus includes an offline memory 203, an SIR measuring unit 205, and a controller 207. The other elements, that is, an RF receiver 201, an ADC (Analog-to-Digital Converter) 202, a searcher 204, and a delay controller 206 provide data or control signals needed to operate the SIR measuring apparatus. They are included in a typical CDMA mobile communication receiver and thus their detailed description will not be provided. An R-CQICH transmitter 208 functions to report an SIR measured in the SIR measuring unit 205 to a base station. It should be noted here that the present invention pertains to the baseband operation of an input signal.

In operation, raw digitized data received through the RF receiver 201 and the ADC 202 is fed to the searcher 204 that searches multiple reflection paths as known, and to the offline memory 203. As implied from its name, the data stored in the offline memory 203 is not processed in real time. The raw digitized data contains F-PICH signals and F-PDCH signals.

The raw digitized data has been digitized with a chip duration of a CDMA signal, that is, a resolution of an eighth of $1/(1.2288 \times 10^6)$ second in the ADC 202 in the present invention, so that there is no time difference larger than an eighth of the chip duration between other chip symbols and a peak chip symbol when correlating low-pass-filtered chip symbols. The searcher 204 continuously tracks time delays involved with multiple reflection paths, performs set maintenance for all active set base stations that transmit pilot signals at or above a predetermined level, and manages a database of the time delays. Basically, the searcher 204 provides information about the active set to the controller 207.

The controller 207 receives information about multiple reflection paths in which signals are received at or above a predetermined level from the active set base stations from the searcher 204 at every predetermined period. The controller 207 also delivers to the offline memory 203 a command requesting the digitized data to be read for a predetermined time length every 1.25-ms/slot.

The controller 207 transmits a PN offset and SIR measure command to the SIR measuring unit 205. In response to the command, the SIR measuring unit 205 measures F-PICH SIRs and F-PDCH SIRs of the read data. The delay controller 206 detects an accurate time delay in each reflection path for the read data and reports the time delays to the SIR measuring unit 205, for SIR measuring with accurate timing.

The SIR measurements are fed to the controller 207. The procedure of measuring PICH SIRs and PDCH SIRs from data read from the offline memory 203 and providing the SIR measurements to the controller 207 is repeated for all active set base stations. After the SIRs are completely measured for all the active set base stations, the controller 207 selects a base station having the highest SIR and transmits the ID and SIR of the selected base station to the base station through the R-CQICH transmitter 208.

The R-CQICH is similar to the F-PDCH in structure except that it is directed from the mobile station to the base station and transmits the ID and SIR of the selected base station.

The above operation takes place in a single 1.25-ms slot time (1536 chips) and the data reading from the offline memory 203 and the SIR measuring in the SIR measuring unit 205 are successive. The timing relationship between the two operations is illustrated in FIG. 4.

Figure 4:
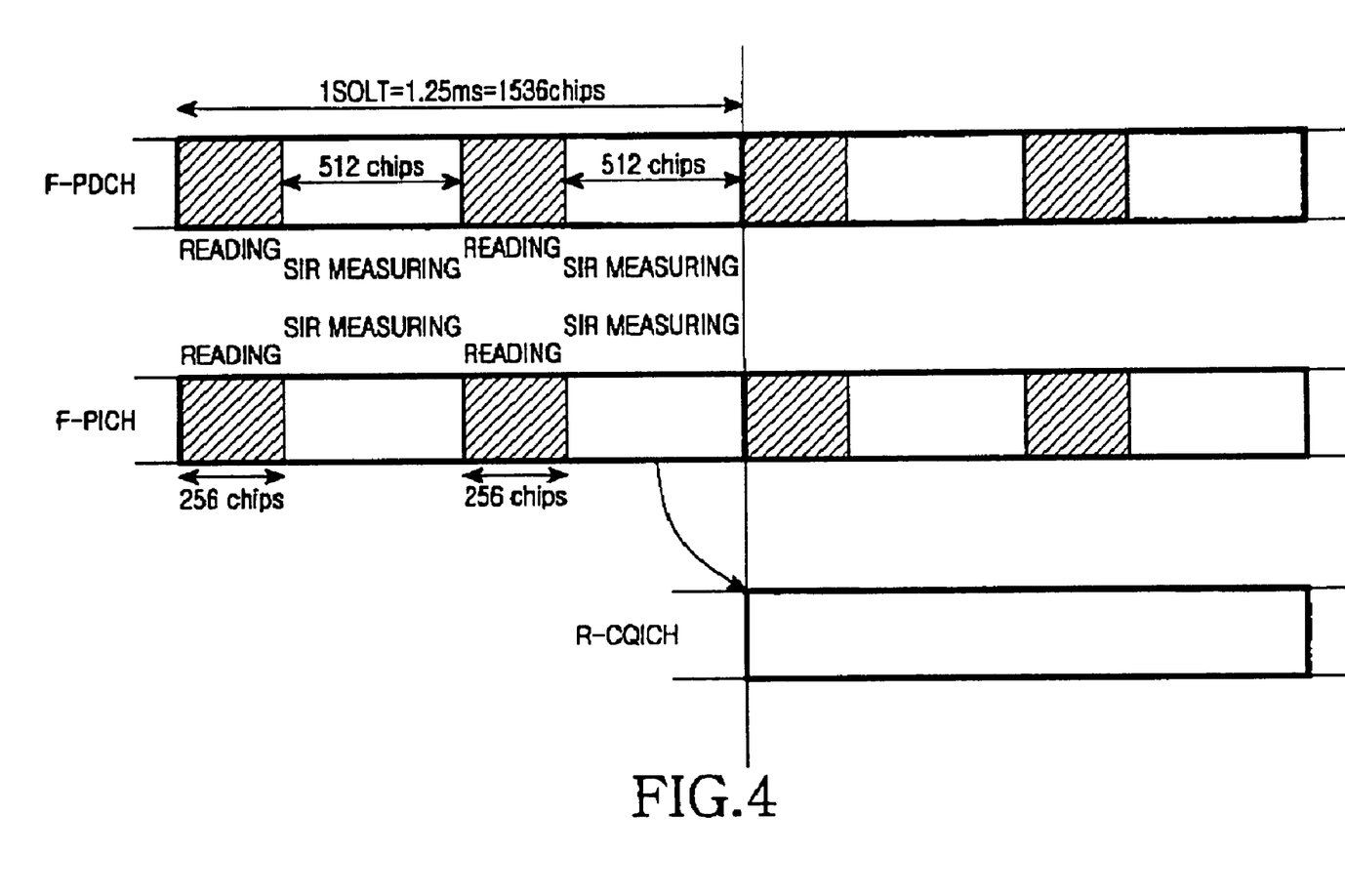
FIG. 4 is a diagram illustrating the timing relationship between SIR measuring and SIR reporting.

Referring to FIG. 4, the data reading and the SIR measuring each occur twice for the 1.25-ms slot time. That is, the first 256 chips of 1536 chips are read from the off line memory 203 and SIRs are measured from the read data for the following 512 chips. The reading and measuring are repeated for the remaining slot time, that is, 768 chips. The second SIR measuring occurs for the last 512 chips and the SIR measurements are fed to the controller 207. FIG. 4 illustrates the operation of the SIR measuring unit 205 at a clock rate eight times as fast as a chip rate of 1.2288 MHz.

Figure 5A:
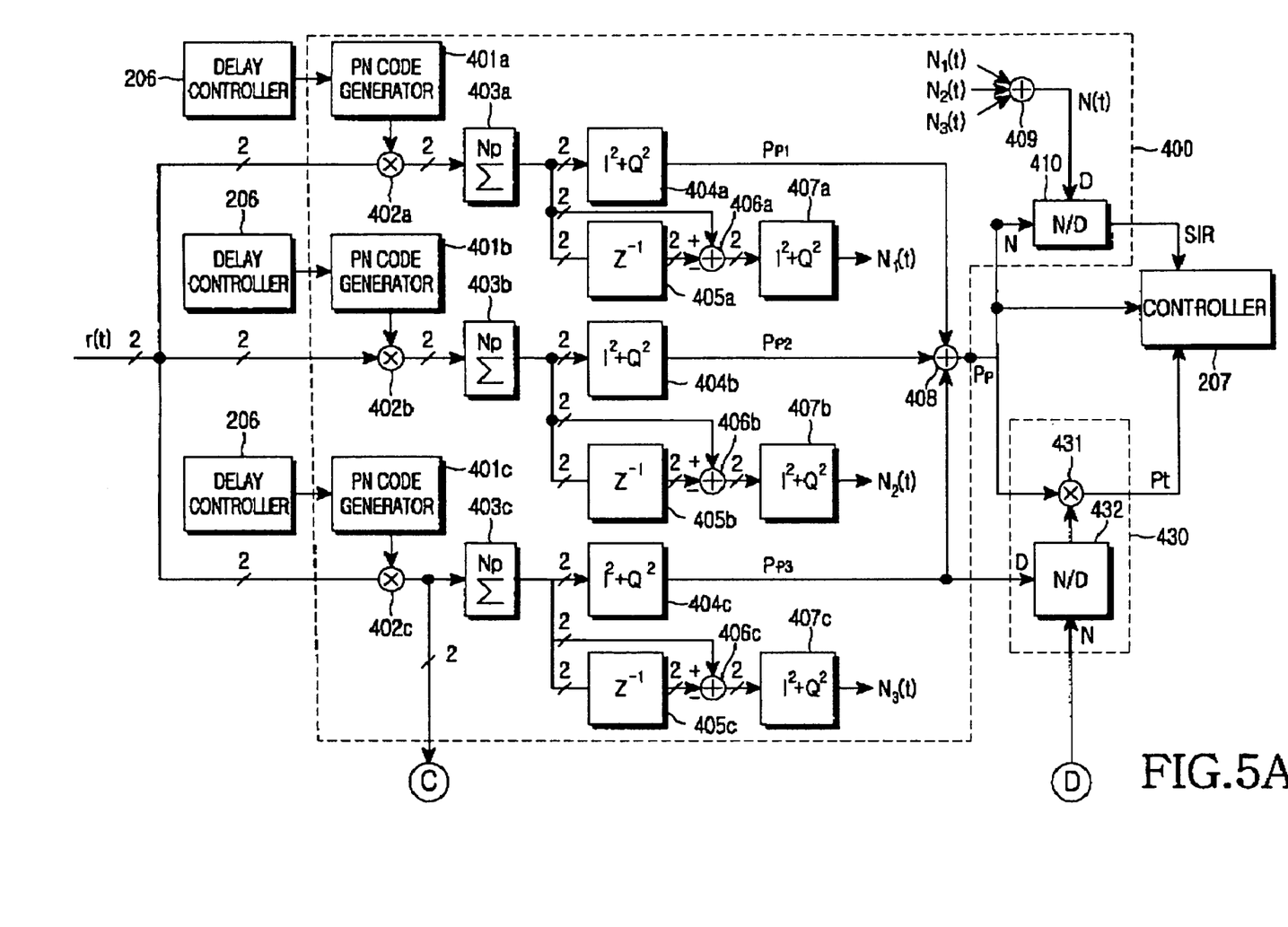
FIGS. 5A and 5B are block diagrams of the SIR measuring apparatus according to the embodiment of the present invention.
Figure 5B:
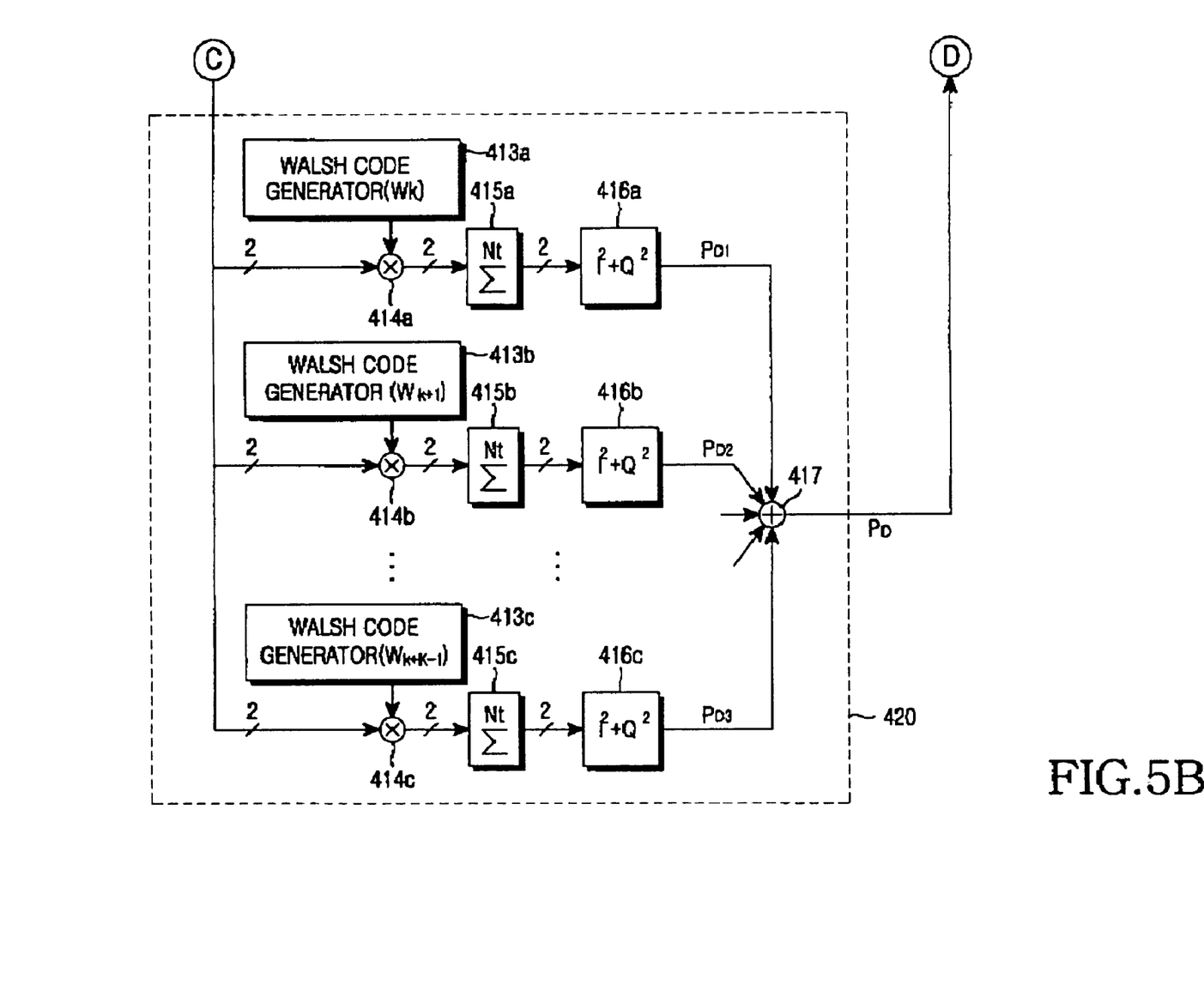

FIGS. 5A and 5B are detailed block diagrams of the SIR measuring unit 205 illustrated in FIG. 3. Referring to FIGS. 5A and 5B, the SIR measuring unit includes an F-PICH SIR measurer 400, a one-path F-PDCH power measurer 420, and an all-path power estimator 430 for estimating the total power of F-PDCH signals from all multiple reflection paths from the power of an F-PDCH signal from one reflection path and the total power of F-PICH signals from the multiple reflection paths. C and D in FIG. 5A are connected to C and D in FIG. 5B, respectively.

Instead of measuring the SIR of the F-PDCH, its power is measured and fed to the controller 207 because comparison of the power of active set base stations is equivalent to comparison of their SIRs. While the F-PICH SIR measurer 400 measures the SIRs of signals from three reflection paths in the embodiment of the present invention, the number of reflection paths is not limited.

The F-PICH SIR measurer 400 is comprised of a first measuring portion (401a to 401c, 402a to 402c, 403a to 403c, 404a to 404c, and 408) for measuring the power of an F-PICH, a second measuring portion (405a to 405c, 406a to 406c, 407a to 407c, and 409) for measuring the interference power of the F-PICH, and a third measuring portion 410 for calculating the SIR of the F-PICH.

With regard to the first measuring portion, the delay controller 206 measures a time delay in each of a predetermined number of reflection paths. PN code generators 401a, 401b, and 401c generate PN codes in synchronization to the delayed time. PN despreaders 402a, 402b, and 402c despread data r(t) read from the offline memory 203 with the PN codes by complex-multiplication.

The PN code generators 401a, 401b, and 401c and the PN despreaders 402a, 402b, and 402c collectively form a PN despreading unit. This PN despreading unit is shared between the F-PICH SIR measurer 400 and the F-PDCH power measurer 420. Therefore, it can be further contemplated as another embodiment that the PN despreading unit is positioned outside the F-PICH SIR measurer 400 or included in the F-PDCH power measurer 420.

Accumulators 403a, 403b, and 403c accumulate the PN-despread signals for the length Np of a Walsh code #0 $W_0$ assigned to the F-PICH and detect pilot symbols. In an IS-2000 synchronous CDMA system having a maximum Walsh code length of 128 bits, the accumulation period of the accumulators 403a, 403b, and 403c is set to 128 bits or a multiple of 128 bits. The pilot symbol detection occurs simultaneously in an I channel signal path and a Q channel signal path. Signal power calculators 404a, 404b, and 404c calculate the power levels of F-PICH signals from the multiple reflection paths using the I-channel and Q-channel pilot symbols ($I^2+Q^2$). The power levels are labeled by $P_{P1}$, $P_{P2}$, and $P_{P3}$ for the respective reflection paths.

With regard to the second measuring portion for measuring the interference power of the F-PICH, symbol delays 405a, 405b, and 405c delay the pilot symbols detected in the accumulators 403a, 403b, and 403c by one symbol duration (Np×chip duration). Subtractors 406a, 406b, and 406c calculate the differences between the delayed pilot symbols and next detected pilot symbols and interference power calculators 407a, 407b, and 407c calculate power levels $N_1(t)$, $N_2(t)$, and $N_3(t)$ corresponding to the differences. The power levels represent interference power from the multiple reflection paths.

The power levels $P_{P1}$, $P_{P2}$, and $P_{P3}$ of the F-PICH signals from the multiple reflection paths are summed in a summer 408. The sum is the all-path power $P_P$ of the F-PICH signals from the multiple reflection paths. A summer 409 sums the interference power levels $N_1(t)$, $N_2(t)$, and $N_3(t)$ and the sum is the all-path interference power N(t) of the F-PICH signals from the multiple reflection paths.

A divider (N/D) 410 calculates the SIR of the F-PICH by dividing the all-path interference power N(t) by the all-path F-PICH power $P_P$.

The F-PDCH power measurer 420 measures the power of an F-PDCH signal from a reflection path having the highest signal strength among the multiple reflection paths. The reflection path having the highest signal strength is selected according to the search result of the searcher 204 illustrated in FIG. 3. Assuming that the last of the three reflection paths has the highest reception strength, the PN despreader 402c feeds the despread signal from the last reflection path to the F-PDCH power measurer 420.

The PN-despread signal from the last reflection path is fed to Walsh despreaders 414a, 414b, and 414c. The Walsh despreaders 414a, 414b, and 414c despread the PN-despread signal with K Walsh codes $W_k$ to $W_{k+K-1}$ assigned to the F-PDCH. The information about the Walsh codes has already been transmitted from the base station to the mobile station on an F-PreCh.

Accumulators 415a, 415b, and 415c accumulate the Walsh-despread signals for the length of the Walsh codes Nt (here, 32 bits) and power calculators 416a, 416b and 416c calculate the power levels of the F-PDCH signal from the accumulated signals by $I^2+Q^2$. A summer 417 sums the power levels with respect to the K Walsh codes. The sum is the power of the F-PDCH from one reflection path, that is, the last reflection path having the highest reception strength.

The all-path power estimator 430 estimates F-PDCH power from the other reflection paths without directly measuring it, using the F-PDCH power from the single reflection path. This is possible because although a signal from each reflection path has a different signal level, a PICH-PDCH power ratio is the same in all the reflection paths.

The all-path power estimator 430 estimates the all-path power $P_t$ of the F-PDCH by multiplying the all-path power $P_P$ of the F-PICH by the ratio of the power $P_D$ of the F-PDCH signal from the last path to the power $P_{P3}$ of the F-PICH signal from the last path ($P_t=P_P \times P_D/P_{P3}$).

The all-path power $P_t$ of the F-PDCH can be achieved with a higher accuracy by calculating the power of the F-PDCH from each reflection path using as many F-PDCH power measurers 420 as the number of multiple reflection paths.

Using the SIR of the F-PICH, the all-path power $P_P$ of the F-PICH, and the all-path power $P_t$ of the F-PDCH, the controller 207 selects an active set base station having the highest signal strength and performs an AMC-related process. It is preferable to implement the controller 207 in software rather than in hardware.

Figure 6:
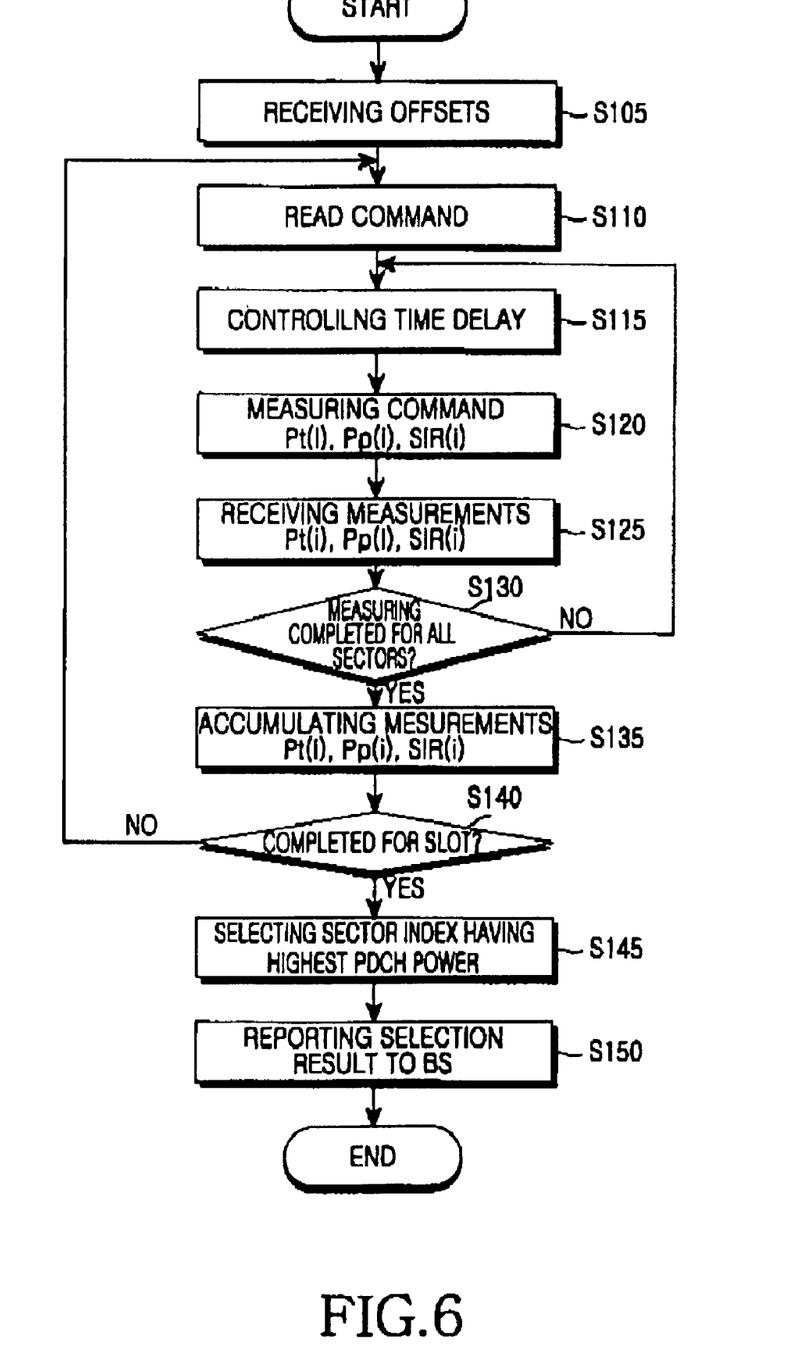
FIG. 6 is a flowchart illustrating an SIR measuring operation according to the embodiment of the present invention.

FIG. 6 is a flowchart illustrating the operation of the controller 207. The following description is made with the appreciation that the mobile station manages an active set containing a set of forward pilot PN offsets that identify Nas active set base stations, the active set varies with a radio environment and the movement of the mobile station, and the searcher 204 updates and manages the PN offsets in real time. Herein, the Nas refers to the number of forward pilot PN code offset in active set.

Referring to FIG. 6, the controller 207 provides information about PN offsets in the active set to the searcher 204 each time the active set is updated in step S105. The actual SIR measuring process starts with reading a predetermined amount of received data (e.g., 256 chips) in each 1.25-ms time slot from the offline memory 203 in step S110. As illustrated in FIG. 4, one or more data readings and SIR measurements may occur for one slot duration.

As many SIRs as the number of PN offsets of the active set are measured from the read data. In general, the active set contains up to eight PN offsets (that is, eight base stations or eight sectors in the case of a sectored base station) and thus up to eight SIRs are measured. Here, a sectored base station is taken for description.

To measure the SIR of a signal having a first PN offset (i.e., sector) in the active set, the controller 207 sets an internal sector index to 0. Then, the controller 207 sets the first PN offset in the delay controller 206 of FIG. 3 in step S115 and commands the SIR measuring unit 205 to measure an SIR in step S120. The SIR measuring unit 205 then measures the power $P_{P(i)}$ of a PICH from the multiple reflection paths, the power $P_{t(1)}$ of a PDCH, and the SIR $SIR_{(i)}$ of the PICH and reports the measurements to the controller 207. Here, i is the index of the current sector.

In step S125, the controller 207 receives the measurements $SIR_{(i)}$, $P_{P(i)}$, and $Pt_{(i)}$ from the SIR measuring unit 205. The controller 207 compares the index i with the number Nas of the forward pilot PN offsets in the active set in step S130. If i is less than Nas, the controller 207 increases the index i by 1 and repeats steps S115 to S125 to measure the SIR of the next sector. If i is equal to or greater than Nas in step S130, the controller 207 proceeds to step S135. When measuring the SIR of the next sector, the PN offset of the sector is set in the delay controller 206.

In step S135, the controller 207 accumulates (the measurements $SIR_{(1)}$, $P_{P(i)}$, and $Pt_{(1)}$ to other measurements of data read from a different portion of the same slot or averages them to obtain representative values for the slot. When two or more data readings and SIR measurings occur for a single slot, the controller 207 determines whether the SIR measuring is completed for the current slot in step S140. If it is not, the controller 207 returns to step S110. If it is, the controller 207 goes to step S145. Steps S135 and S140 are needed when two or more SIR measurings are made for one time slot.

In step S145, the controller 207 compares the power levels $P_{t(1)}$ of PDCHs from the sectors in the active set and selects a sector index i having the highest power level. The controller 207 reports the selected sector and the SIR of the sector to the base station on an R-CQICH in step S150. Along with the information, a forward data rate corresponding to the SIR, or the SIR and the power level $P_{t(i)}$ of the PDCH from the sector can be reported.

In accordance with the present invention as described above, SIR measuring is simplified without using a plurality of SIR measurers by storing received data in an offline memory and sequentially calculating the SIRs of signals from sectors or base stations in an active set. Therefore, the size of a CDMA mobile communication receiver is reduced and a high rate packet transmission is ensured. Furthermore, measuring PDCH power, PICH power, and an SIR in an SIR measurer enables efficient implementation of AMC. As a result, a packet transmission error is reduced and transmission efficiency is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiving apparatus in a mobile communication system that supports voice and packet data services, and manages an active set being a list of PN (Pseudorandom Noise) offsets of communicable transmitting apparatuses, comprising:

an offline memory for storing received data in real time and outputting a predetermined amount of the received data in response to an external read command;

an SIR (Signal-to-Interference Ratio) measuring unit for separately measuring a power and aSIR of PICH (Pilot Channel) signals and a power assigned to PDCH (Packet Data Channel) signals from the transmitting apparatuses in the active set from the read data, while varying the PN offsets, in response to an external measure command; and a controller for providing the external read command to the offline memory and the external measure command to the SIR measuring unit, and collecting the measured SIR wherein the SIR measuring unit comprises a PICH SIR measurer for measuring power and interference power of a PICH from each of multiple reflection paths from the transmitting apparatuses to the receiving apparatus, calculating all-path power and all-path interference power of the PICH, and calculating an SIR of the PICH;

a PDCH power measurer for measuring the power of a PDCH from one of the multiple reflection paths; and an all-path power estimator for estimating all-path power of the PDCH from the multiple reflection paths using the all-path power of the PICH and the power of the PDCH from the one reflection path, and further wherein the PDCH power measurer comprises a PN code generator for generating a PN code in synchronization to a time delay in the selceted one of the multiple reflection paths:

a PN despreader for complex-despreading the read data received from the offline memory with the PN code;

a plurality of Walsh code generators for generating a plurality of Walsh codes assigned to the PDCH:

a plurality of Walsh despreaders for despreading the output of the PN despreader with the Walsh codes:

a plurality of accumulators for accumulating the outputs of the Walsh despreaders for a length of the Walsh codes:

a plurality of power calculators for calculating a power of the PDCH with respect to each Walsh code using the outputs of the accumulators: and a summer for calculating the power of the PDCH from the selected reflection path by summing the outputs of the power calculators.

2. The receiving apparatus of claim 1, wherein the PICH SIR measurer comprises:
   a first measuring portion for measuring the all-path power of the PICH from the multiple reflection paths;
   a second measuring portion for measuring the all-path interference power of the PICH from the multiple reflection paths; and
   a third measuring portion for calculating the SIR of the PICH by dividing the all-path interference power of the PICH by the all-path power of the PICH.

3. The receiving apparatus of claim 2, wherein the first measuring portion comprises:
   a plurality of PN code generators for generating PN codes in synchronization to time delays in the multiple reflection paths;
   a plurality of PN despreaders for complex-despreading the read data received from the offline memory with the PN codes;
   a plurality of accumulators for accumulating the PN-despread signals for a length of a Walsh code;
   a plurality of power calculators for calculating the power of the PICH from each of the multiple reflection paths using the outputs of the accumulators; and
   a first summer for calculating the all-path power of the PICH by summing the outputs of the power calculators.

4. The receiving apparatus of claim 3, wherein the second measuring portion comprises:
   a plurality of symbol delays for delaying the outputs of the accumulators by one symbol duration;
   a plurality of subtractors for subtracting the outputs of the symbol delays from the outputs of the accumulators;
   a plurality of interference power calculators for calculating the interference power of the PICH from each of the multiple reflection paths using the outputs of the subtractors; and
   a second summer for calculating the all-path interference power of the PICH by summing the outputs of the interference power calculators.

5. The receiving apparatus of claim 1, wherein the selected reflection path has a highest signal strength among the multiple reflection paths.

6. The receiving apparatus of claim 1, wherein the all-path power estimator estimates the all-path power of the PDCH from the multiple reflection paths by dividing the power of the PDCH from the selected reflection path by the power of the PICH from the selected reflection path and multiplying the division result by the all-path power of the PICH.

7. The receiving apparatus of claim 6, wherein the selected reflection path has a highest signal strength among the multiple reflection paths.

8. An SIR (Signal-to-Interference Ratio) measuring apparatus in a mobile communication system that supports voice and packet data services, and manages an active set being a list of the PN (Pseudorandom Noise) offsets of communicable transmitters, comprising:
   a PICH (Pilot Channel) SIR measurer for measuring power and interference power of a PICH from each of multiple reflection paths from the transmitters to a receiver from received data, calculating all-path power and all-path interference power of the PICH from the multiple reflection paths, and calculating an SIR of the PICH;
   a PDCH power measurer for measuring power of a PDCH from a selected one of the multiple reflection paths from received data; and
   an all-path power estimator for estimating all-path power of the PDCH from the multiple reflection paths using the power of the PDCH measured in the PDCH power measurer,
   wherein the PDCH power measurer comprises a PN code generator for generating a PN code in synchronization to a time delay in the selected reflection path:
   a PN despreader for complex-despreading the received data with the PN code;
   a plurality of Walsh code generators for generating a plurality of Walsh codes assigned to the PDCH;
   a plurality of Walsh despreaders for despreading the output of the PN despreader with the Walsh codes:
   a plurality of accumulators for accumulating the outputs of the Walsh despreaders for a lenuth of the Walsh codes:
   a plurality of power calculators for calculating the power of the PDCH with respect to each Walsh code using the outputs of the accumulators; and
   a summer for calculatina the power of the PDCH from die selected rellection path by summing the outputs of the power calculators.

9. The SIR measuring apparatus of claim 8, wherein the PICH SIR measurer comprises:
   a first measuring portion for measuring the all-path power of the PICH from the multiple reflection paths;
   a second measuring portion for measuring the all-path interference power of the PICH from the multiple reflection paths; and
   a third measuring portion for calculating the SIR of the PICH by dividing the all-path interference power of the PICH by the all-path power of the PICH.

10. The SIR measuring apparatus of claim 9, wherein the first measuring portion comprises:
    a plurality of PN code generators for generating PN codes in synchronization to time delays in the multiple reflection paths;
    a plurality of PN despreaders for complex-despreading the received data with the PN codes;
    a plurality of accumulators for accumulating the outputs of the PN despreaders for a length of a Walsh code;
    a plurality of power calculators for calculating the power of the PICH from each of the multiple reflection paths using the outputs of the accumulators; and
    a first summer for calculating the all-path power of the PICH by summing the outputs of the power calculators.

11. The SIR measuring apparatus of claim 10, wherein the second measuring portion comprises:
    a plurality of symbol delays for delaying the outputs of the accumulators by one symbol duration;
    a plurality of subtractors for subtracting the outputs of the symbol delays from the outputs of the accumulators;
    a plurality of interference power calculators for calculating the interference power of the PICH from each of the multiple reflection paths using the outputs of the subtractors; and
    a second summer for calculating the all-path interference power of the PICH by summing the outputs of the interference power calculators.

12. The SIR measuring apparatus of claim 8, wherein the selected reflection path has a highest signal strength among the multiple reflection paths.

13. The SIR measuring apparatus of claim 8, wherein the all-path power estimator estimates the all-path power of the PDCH from the multiple reflection paths by dividing the power of the PDCH from the selected reflection path by the power of the PICH from the selected reflection path and multiplying the division result by the all-path power of the PICH.

14. A power measuring method in a mobile communication system that supports voice and packet data services, and manages an active set being a list of the PN (Pseudorandom Noise) offsets of communicable transmitters, comprising the steps of:

reading a predetermined amount of data from an offline memory that stores data received in real time;

separately measuring a power and an SIR (Signal-to-Interference Ratio) of a PICH (Pilot Channel) and a power of a PDCH (Packet Data Channel) from each of the transmitters in the active set from the read data, while varying the PN offsets;

comparing the power of PDCHs from the transmitters and selecting a transmitter having a highest PDCH power;

notifying the selected transmitter of the selection;

determining whether the power and the SIR of the PICH and the power of the PDCH have been completely measured for a predetermined slot duration, if at least two data readings are made for the predetermined slot duration;

reading next data in a same slot from the offline memory if the measuring has not been completed for the slot duration;

measuring the power and the SIR of the PICH and the power of the PDCH from each of the transmitters in the active set from the next read data, while varying the PN offsets; and obtaining the power and the SIR of the PICH and the power of the PDCH for the slot by at least one of accumulation and averaging, if the measuring has been completed.

15. The power measuring method of claim 14, wherein a forward data rate corresponding to the SIR of the PICH is determined for the selected transmitter and information about the data rate and the ID of the selected transmitter is transmitted to the selected transmitter in the notification step.

* * * * *